United States Patent
Lee

(10) Patent No.: US 7,108,926 B2
(45) Date of Patent: Sep. 19, 2006

(54) PERPENDICULAR MAGNETIC RECORDING MEDIUM

(75) Inventor: Byung-kyu Lee, Seoul (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 10/029,701

(22) Filed: Dec. 31, 2001

(65) Prior Publication Data

US 2002/0086186 A1    Jul. 4, 2002

(30) Foreign Application Priority Data

Jan. 4, 2001    (KR) .................................. 2001-370

(51) Int. Cl.
*G11B 5/66*    (2006.01)
*G11B 5/70*    (2006.01)

(52) U.S. Cl. .................................... 428/831; 428/831.2

(58) Field of Classification Search .......... 428/694 TS, 428/336, 694 TM, 900, 831, 828, 831.2
See application file for complete search history.

(56) References Cited

U.S. PATENT DOCUMENTS

| | | | |
|---|---|---|---|
| 5,637,411 A | 6/1997 | Shimazaki et al. | |
| 5,660,929 A | 8/1997 | Suzuki et al. | |
| 5,738,927 A * | 4/1998 | Nakamura et al. | 428/141 |
| 5,750,270 A * | 5/1998 | Tang et al. | 428/611 |
| 6,139,981 A | 10/2000 | Chuang et al. | |
| 6,420,058 B1 * | 7/2002 | Haratani et al. | 428/694 T |
| 6,537,638 B1 * | 3/2003 | Do et al. | 428/65.3 |
| 6,541,125 B1 * | 4/2003 | Futamoto et al. | 428/611 |
| 6,753,072 B1 * | 6/2004 | Chen et al. | 428/828 |

FOREIGN PATENT DOCUMENTS

| | | |
|---|---|---|
| JP | 64055764 | 3/1989 |
| JP | 6076260 | 3/1994 |
| JP | 7334832 | 12/1995 |
| JP | 8129738 | 5/1996 |
| JP | 2000-207721 | 7/2000 |
| JP | 2000-215432 | 8/2000 |
| JP | 2000215434 | 8/2000 |

OTHER PUBLICATIONS

Office Action issued by the Japanese Patent Office on Nov. 17, 2004, in corresponding application.

* cited by examiner

*Primary Examiner*—Holly Rickman
(74) *Attorney, Agent, or Firm*—Buchanan Ingersoll & Rooney PC

(57) ABSTRACT

Provided is a perpendicular magnetic recording medium including a perpendicular magnetic enhancement layer having a thickness of 15 nm or greater between a substrate and a perpendicular magnetic recording layer.

9 Claims, 5 Drawing Sheets

| MATERIAL | STRUCTURE | LATTICE CONSTANT (Å) | PLANE 1 (Å) | PLANE 2 (Å) | JCPDS Card No. |
|---|---|---|---|---|---|
| Co | HEXAGONAL | 2.5031 | (0001) 2.50 | (0001) 2.50 | 05-0727 |
| Pt | FACE-CENTERD CUBIC | 3.9231 | (100) 3.92 | (111) 5.55 | 04-0802 |
| Ti | HEXAGONAL | 2.9505 | (0001) 2.95 | (0001) 5.90 | 44-1294 |

PERPENDICULAR MAGNETIC RECORDING MEDIUM

Priority is claimed to Patent Application Number 2001-155, filed in the Republic of Korea on Jan. 3, 2001, herein incorporated by reference.

BACKGROUND OF THE INVENTION

1. Field of the Invention

The present invention relates to magnetic recording media used in hard disk drives (HDDs), and more particularly, to a perpendicular magnetic recording medium with improved thermal stability of record information and high signal-to-noise ratio.

2. Description of the Related Art

In longitudinal magnetic recording (LMR) applied to hard disk drives (HDDs), a major external data storage device of computers, the size of a data record domain in a magnetic disk has decreased with microstructure as the need for high-density data recording increases. However, this decrease in size makes the data record domains susceptible to removal by thermal energy generated by operation of the HDD which is more dominant than magnetostatic energy from the data record domain. This is referred to as the super paramagnetic effect. To overcome the super paramagnetic effect, the LMR technique has been replaced by a perpendicular magnetic recording (PMR) technique for HDD applications. The PMR technique uses a higher electrostatic energy and lower demagnetization energy compared to the LMR technique, so it is advantageous in high-density data recording. The high-density PMR technique also has enabled detection of a micro data domain in combination with advances in the manufacture of highly sensitive read heads.

The schematic structure of a single-layer PMR medium is shown in FIG. 1. The single-layer PMR medium includes an underlayer 12 for promoting the perpendicular orientation of a perpendicular magnetic recording layer 13 formed over the underlayer 12, the perpendicular magnetic recording layer 13 having the perpendicular magnetic anisotropy energy to keep the perpendicular orientation of the data record domain, a protective layer 14 for protecting the perpendicular magnetic recording layer 13 from external impacts, and a lubricant layer 15 on a glass or aluminum alloy substrate 11.

The perpendicular magnetic recording layer 13 has the perpendicular magnetic anisotropy energy with a magnetic easy axis oriented perpendicular to the plane of the perpendicular magnetic recording layer 13 due to the underlayer 12.

Recording density in a perpendicular magnetic recording mechanism is largely affected by the characteristics of the perpendicular magnetic recording layer and the perpendicular orientation promoting underlayer.

In a conventional PMR medium, as shown in FIG. 1A, an underlayer disposed below a PMR layer to promote perpendicular magnetic orientation of the PMR layer is formed of titanium (Ti), and the PMR layer is formed of a Co alloy. In this case, the mismatch between the lattice constants of the Ti underlayer and the Co-alloy PMR layer is considerably high at about 18%. When the lattice constant mismatch becomes larger, a perpendicular magnetic degradation layer 16, a buffer layer with inferior magnetic properties, is formed on the Ti underlayer in the course of crystal growth of the Co-ally PMR layer, as shown in FIG. 1B. The perpendicular magnetization degradation layer 16 reduces the thickness of the crystalline PMR layer. As a result, the magnetic properties of the PMR layer are degraded with low signal-to-noise (SNR) ratio.

A Ti layer typically used for the perpendicular orientation promoting layer shows poor perpendicular orientation properties when deposited because the value of $\Delta\theta 50$ is large, which indicates an angle of crystal growth deviating from the perpendicular axis. Such a poor degree of the perpendicular orientation in the underlayer affects the perpendicular orientation of crystals being grown for the PMR layer and thereby increases $\Delta\theta 50$ of the PMR layer.

An increase in grain size of the PMR layer as well as the perpendicular orientation reduction described above reduces the SNR of the PMR layer, thereby limiting high-density recording.

SUMMARY OF THE INVENTION

To solve the above-described problems, it is an objective of the present invention to provide a perpendicular magnetic recording (PMR) medium capable of reducing a lattice constant mismatch between a perpendicular orientation promoting underlayer and a PMR layer and capable of improving the perpendicular orientation properties of the perpendicular orientation promoting underlayer.

To achieve the objective of the present invention, there is provided a perpendicular magnetic recording medium in which a perpendicular magnetic enhancement layer having a thickness of 15 nm or greater is deposited between a substrate and a perpendicular magnetic recording layer.

It is preferable that the perpendicular magnetic recording medium further comprises a perpendicular orientation promoting underlayer between the substrate and the perpendicular magnetic enhancement layer for promoting the perpendicular orientation of the perpendicular magnetic recording layer. It is preferable that the perpendicular magnetic enhancement layer is formed of at least one selected from the group consisting of Pt, Au, Pd and an alloy of these materials. It is preferable that the perpendicular orientation promoting underlayer is formed of Ti or a Ti alloy and has a thickness less than 10 nm. It is preferable that the perpendicular magnetic recording layer is formed of a CoCr alloy. It is preferable that the perpendicular magnetic recording layer further comprises at least one material selected from the group consisting of B, Pt, Ta, V, Nb, Zr, Y, and Mo.

The PMR medium according to the present invention has good recording performance for a single-layer structure, a double-layer structure including a soft magnetic layer between a perpendicular orientation promoting underlayer and a substrate, or a pseudo double-layer structure including a soft magnetic layer between a perpendicular orientation promoting underlayer and a perpendicular magnetic recording layer. According to the present invention, the perpendicular magnetic recording layer may be formed of a multiple-layer as well as a single layer.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

Figure 1A:
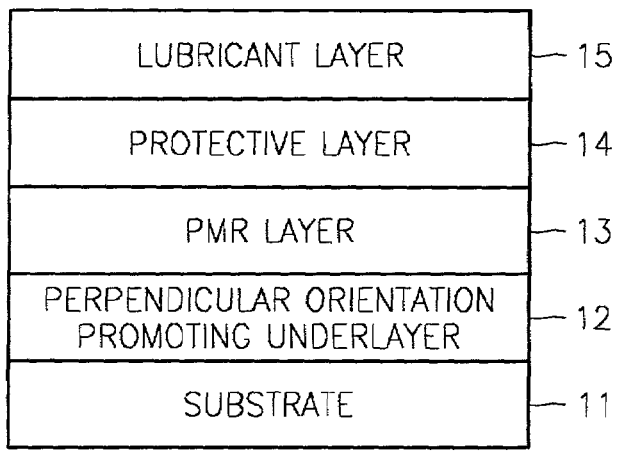
FIG. 1A is a sectional view showing the structure of a single-layer perpendicular magnetic recording (PMR) disk.
Figure 1B:
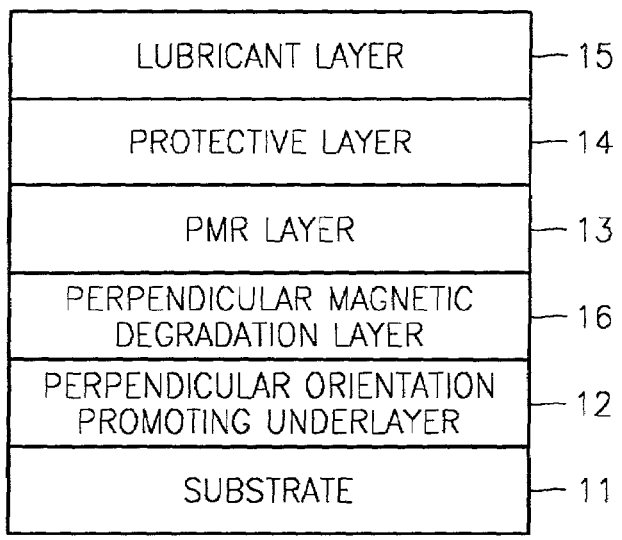
FIG. 1B illustrates formation of a perpendicular magnetic degradation layer due to the lattice constant mismatch between a perpendicular orientation promoting underlayer and a perpendicular magnetic recording layer.
Figure 2A:
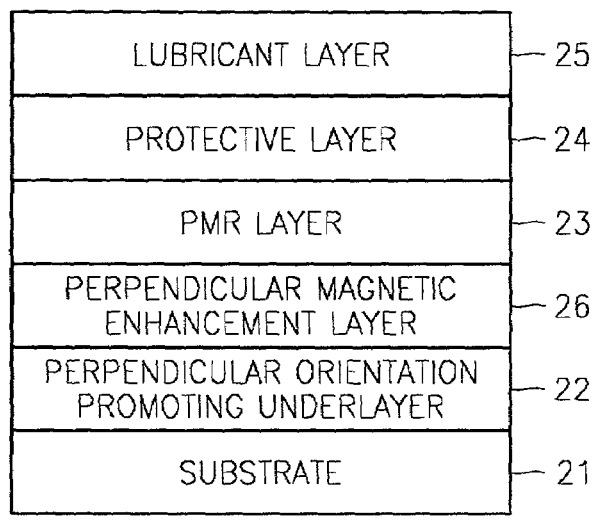
FIG. 2A shows the schematic structure of a preferred embodiment of a PMR medium according to the present invention having a perpendicular magnetic enhancement layer between a perpendicular orientation promoting underlayer and a PMR layer.
Figure 2B:
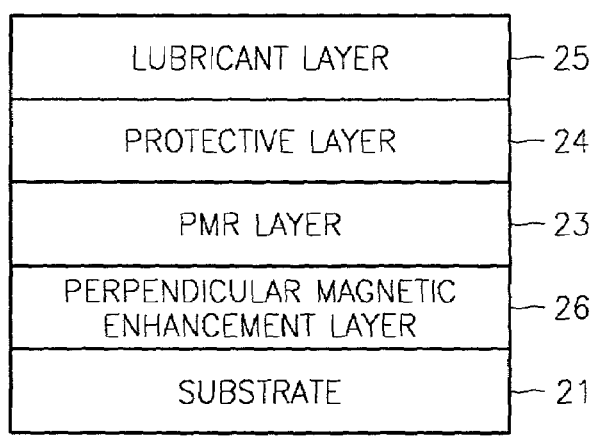
FIG. 2B shows the schematic structure of another preferred embodiment of the PMR medium according to the present invention in which a perpendicular magnetic enhancement layer is deposited directly on a substrate without a perpendicular orientation promoting underlayer.

The schematic structures of preferred embodiments of a perpendicular magnetic recording (PMR) medium according to the present invention are shown in FIGS. 2A and 2B. In FIG. 2A, a preferred embodiment of the PMR medium according to the present invention includes a perpendicular magnetic enhancement layer 26 between a perpendicular orientation promoting underlayer 22 and a PMR layer 23 to reduce the lattice constant mismatch between the perpendicular magnetic enhancement layer 26 and the PMR layer 2 and improve the perpendicular orientation properties (Δθ50). As a result, the PMR medium has improved SNR and high-density recording properties.

In another preferred embodiment of the PMR medium according to the present invention shown in FIG. 2B, a perpendicular magnetic enhancement layer 26 is deposited directly on a substrate 21 without a perpendicular orientation promoting underlayer, and a PMR layer 23, a protective layer 24, and a lubricant layer 25 are sequentially deposited on the perpendicular magnetic enhancement layer 26. In the PMR medium shown in FIG. 2, generation of a perpendicular magnetization degradation layer in the PMR layer 23 is suppressed to reduce a lattice constant mismatch therein and thereby to improve the perpendicular orientation properties (Δθ50) of the PMR layer 23. As a result, the SNR and high-density recording properties are improved for the PMR medium.

The perpendicular magnetic enhancement layer 26 is formed of a metal with excellent perpendicular orientation properties, and preferably, Pt, Au, Pd or an alloy of these materials to a thickness of 15 nm or greater. It has been experimentally found by the inventors that the perpendicular magnetic enhancement layer having a thickness of 15 nm or greater ensures stable depositions of the underlying and overlying layers. The upper limit of thickness is not significant for the perpendicular magnetic enhancement layer and thus the perpendicular magnetic enhancement layer can be formed to an arbitrary thickness within a predetermined range for a normal PMR medium.

The principle of reducing the lattice constant mismatch between the underlayer and the PMR layer and enhancing the perpendicular orientation property by a perpendicular magnetic enhancement layer formed of Pt will be described below.

Figures 3, 4:
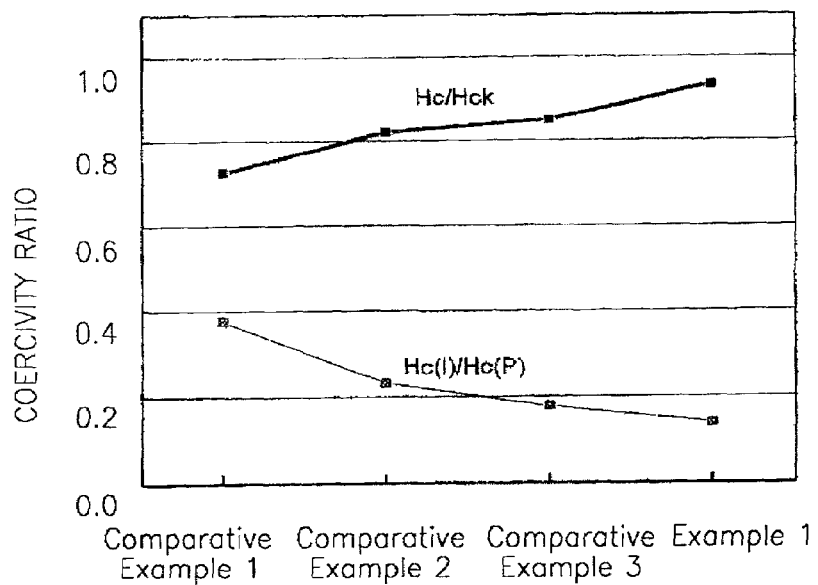
FIG. 3 comparatively shows crystalline properties including lattice structure and constant for materials used for a PMR layer, a perpendicular orientation promoting underlayer, and a perpendicular magnetic enhancement layer.
FIG. 4 shows magnetic properties of PMR disks manufactured in Example 1 and Comparative Examples 1 through 3.

FIG. 3 comparatively shows crystalline properties including lattice structure and constant for a Ti layer typically used for a perpendicular orientation promoting underlayer, a CoCr layer for a PMR layer, and a Pt layer for a perpendicular magnetic enhancement layer.

According to the present invention, the perpendicular orientation promoting underlayer may be formed of Ti or a Ti alloy and may have a thickness less than 10 nm. If the thickness of the perpendicular orientation promoting underlayer is not less than 10 nm, there is a problem of grain size increase in growing crystals, thereby lowering the SNR.

Referring to FIG. 3, the Ti underlayer is deposited with a (0001) oriented face and an atomic spacing of 5.9 Å on Plane 2. The CoCr PMR layer is deposited with a (0001) oriented face and an atomic spacing of 5.01 Å on Plane 2. The lattice constant mismatch between these two layers amounts to about 18%. Such a large difference between the lattice constants of the layers results in an intermediate perpendicular magnetization degradation layer, thereby lowering the magnetic recording properties.

In the present invention, to prevent such magnetic recording property degradation, a layer is deposited between the Ti underlayer and the CrCo PMR layer to an appropriate thickness using a material such as Pt, Au, Pd or an alloy of these materials having an atomic spacing ranging between the atomic spacings of Ti and CoCr to suppress the generation of the intermediate degradation layer described above. Pt, Au, Pd and an alloy of these materials also have good perpendicular orientation properties and thus they can improve the perpendicular orientation properties (lower Δθ50) of the PMR layer.

The present invention will be described in greater detail by means of the following examples. The following examples are for illustrative purposes and are not intended to limit the scope of the invention.

EXAMPLE 1

A Ti underlayer was deposited on a 0.635-mm-thick glass substrate to a thickness of 9.5 nm, and a Pt perpendicular magnetic enhancement layer was deposited thereon to a thickness of 30 nm. A CoCr alloy perpendicular magnetic recording (PMR) layer was formed on the Pt perpendicular magnetic enhancement layer to a thickness of 40 nm. Next, a carbon-based layer was formed as a protective layer on the CoCr alloy PMR layer to a thickness of 10 nm, and a 2-nm-thick lubricant layer was formed thereon using Z-DOL (0.04%, available from Ausimont Co.), thereby resulting in a signal-layer PMR disk.

EXAMPLE 2

A single-layer PMR disk was manufactured in the same manner as in Example 2 except that the Pt perpendicular magnetic enhancement layer was deposited to a thickness of 50 nm.

EXAMPLE 3

A single-layer PMR disk was manufactured in the same manner as in Example 3 except that a 50-nm-thick Pt perpendicular magnetic enhancement layer was deposited directly on the glass substrate without deposition of a Ti underlayer.

EXAMPLE 4

A double-layer PMR disk was manufactured in a similar manner as in Example 1 except that a NiFe alloy soft magnetic layer was formed on the glass substrate to a thickness of 400 nm and the Pt perpendicular magnetic enhancement layer was deposited thereon to a thickness of 15 nm.

EXAMPLE 5

A double-layer PMR disk was manufactured in a similar manner as in Example 1 except that a NiFe alloy soft magnetic layer was formed on the glass substrate to a thickness of 400 nm, followed by deposition of a 5-nm-thick Ti underlayer and then a 10-nm-thick Pt perpendicular magnetic enhancement layer.

EXAMPLE 6

A pseudo double-layer PMR disk was manufactured in a similar manner as in Example 1 except that a NiFe alloy soft magnetic layer was formed on a 0.635-mm-thick glass substrate to a thickness of 9.5 nm, followed by deposition of a 40-nm-thick Ti underlayer and a 20-nm-thick Pt perpendicular magnetic enhancement layer.

EXAMPLE 7

A pseudo double-layer PMR disk was manufactured in a similar manner as in Example 1 except that a NiFe alloy soft magnetic layer was formed on a 0.635-mm-thick glass substrate to a thickness of 10 nm, followed by deposition of a 10-nm-thick Pt perpendicular magnetic enhancement layer.

EXAMPLE 8

A 9.5-nm-thick Ti underlayer, a 30-nm-thick Pt perpendicular magnetic enhancement layer, and a 10-nm-thick NiFe alloy soft magnetic layer were sequentially deposited on a 0.635-mm-thick glass substrate. Next, a 10-nm-thick Pt perpendicular magnetic enhancement layer was deposited thereon, followed by deposition of a 50-nm-thick CoCr alloy PMR layer. A carbon-based layer was formed as a protective layer on the CoCr alloy PMR layer to a thickness of 10 nm, and a 2-nm-thick lubricant layer was formed thereon using Z-DOL (0.04%, available from Ausimont Co.), thereby resulting in a pseudo double-layer PMR disk.

EXAMPLE 9

A 30-nm-thick Pt perpendicular magnetic enhancement layer, a 10-nm-thick NiFe alloy soft magnetic layer, and a 9.5-nm-thick Ti underlayer were sequentially deposited on a 0.635-mm-thick glass substrate. Next, a 20-nm-thick Pt perpendicular magnetic enhancement layer was deposited thereon, followed by deposition of a 50-nm-thick CoCr alloy PMR layer. A carbon-based layer was formed as a protective layer on the CoCr alloy PMR layer to a thickness of 10 nm, and a 2-nm-thick lubricant layer was formed thereon using Z-DOL (0.04%, available from Ausimont Co.), thereby resulting in a pseudo double-layer PMR disk.

EXAMPLE 10

A pseudo double-layer PMR disk was manufactured in a similar manner as in Example 1 except that a 50-nm-thick Pt perpendicular magnetic enhancement layer was deposited, followed by deposition of a 10-nm-thick NiFe alloy soft magnetic layer.

EXAMPLE 11

A pseudo double-layer PMR disk was manufactured in a similar manner as in Example 10 except that a 9.5-nm-thick Ti underlayer, a 40-nm-thick Pt perpendicular magnetic enhancement layer, a 10-nm-thick NiFe alloy soft magnetic layer, and a CoCr alloy PMR layer were sequentially deposited.

COMPARATIVE EXAMPLE 1

A 40-nm-thick CoCr alloy PMR layer was deposited directly on a 0.635-mm-thick glass substrate. Next, a carbon-based layer was formed as a protective layer on the CoCr alloy PMR layer to a thickness of 10 nm, and a 2-nm-thick lubricant layer was formed thereon using Z-DOL (0.04%, available from Ausimont Co.), thereby resulting in a conventional single-layer PMR disk.

COMPARATIVE EXAMPLE 2

A 50-nm-thick Ti underlayer was deposited on a 0.635-mm-thick glass substrate, followed by deposition of a 40-nm-thick CoCr alloy PMR layer. Next, a carbon-based layer was formed as a protective layer on the CoCr alloy PMR layer to a thickness of 10 nm, and a 2-nm-thick lubricant layer was formed thereon using Z-DOL (0.04%, available from Ausimont Co.), thereby resulting in a conventional single-layer PMR disk.

COMPARATIVE EXAMPLE 3

A single-layer PMR disk was manufactured in the same manner as in Comparative Example 1 except that a 40-nm-thick underlayer was deposited on a 0.635-mm-thick glass substrate using Pt instead of Ti.

COMPARATIVE EXAMPLE 4

A single-layer PMR disk was manufactured in the same manner as in Example 1 except that the thickness of the Pt perpendicular magnetic enhancement layer was reduced to 10 nm.

The magnetic properties were determined for the PMR disks manufactured in the above examples. The results are shown in FIG. 4. In FIG. 4, the ratio of total coercivity Hc of the PMR layer measured using a vibrating sample magnetometer (VSM) to surface coercivity Hck of the PMR layer measured using a Kerr magnetometer was compared. A high value of Hc/Hck indicates that the coercivity is uniform through the PMR layer. A low value of Hc/Hck indicates coercivity reduction caused by, for example, generation of an intermediate magnetization degradation layer. In view of this, it is found from FIG. 4 that generation of the intermediate magnetization degradation layer is effectively suppressed in the PMR disk manufactured in Example 1.

In FIG. 4, Hc(L)/Hc(P) is the ratio of longitudinal coercivity to perpendicular coercivity of the PMR layer. The lower ratio of Hc(L)/Hc(P) indicates highly ordered crystal orientation and excellent magnetic recording properties of the PMR layer. The PMR disk (Example 1) according to the present invention with the Pt perpendicular magnetic enhancement layer on the Ti underlayer shows most excellent magnetic properties, as shown in FIG. 4.

Figure 5:
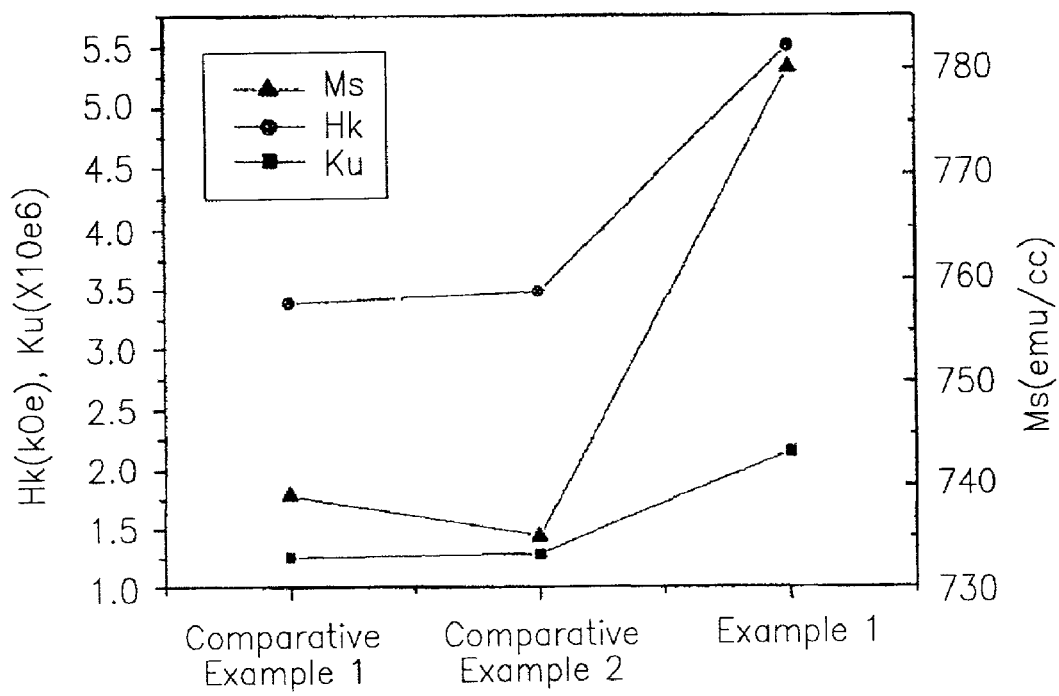
FIG. 5 shows magnetic properties of the PMR disks manufactured in Example 1 and Comparative Examples 1 and 2.

FIG. 5 comparatively shows the magnetic properties of the PMR disks manufactured in Example 1 and Comparative Examples 1 and 2 for perpendicular magnetic anisotropy energy Ku, anisotropy field Hk, and saturation magnetization Ms. As is obvious from FIG. 5, the PMR disk manufactured in Example 1 has high Ku, Hk, and Ms, leading to the belief that a PMR medium with good perpendicular magnetic properties can be formed by deposition of a Pt layer having an appropriate thickness between a perpendicular orientation promoting underlayer and a PMR layer.

Figure 6:
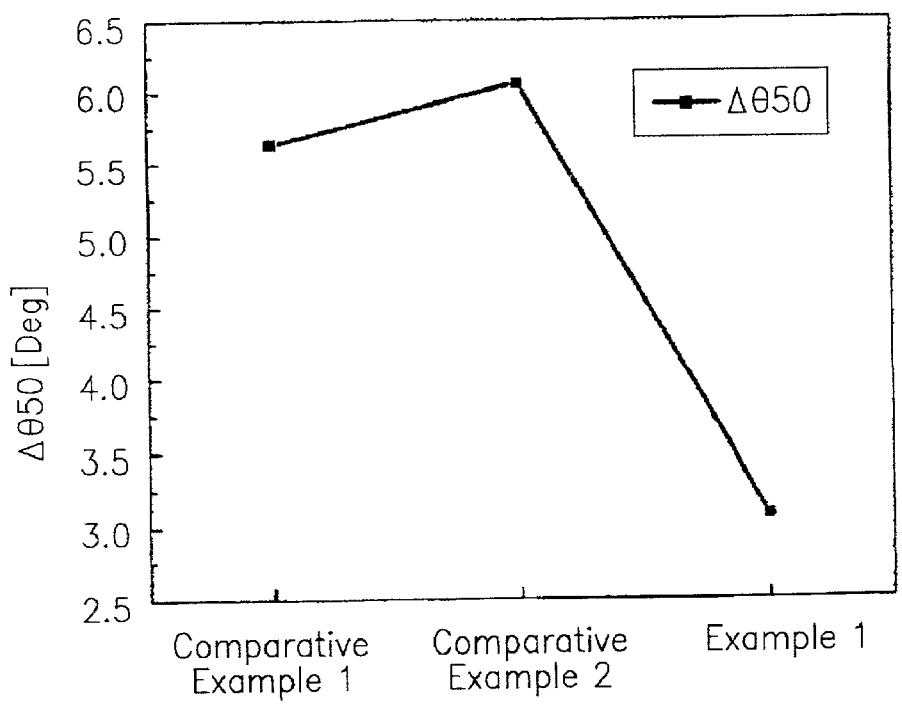
FIG. 6 shows perpendicular orientation properties of the PMR disks manufactured in Example 1 and Comparative Examples 2 and 3.

FIG. 6 is a graph of Δθ50 comparatively showing the perpendicular orientation properties for the PMR disks manufactured in Example 1 and Comparative Examples 2 and 3. Δθ50 means an angle of crystal growth deviating from the perpendicular axis. A small value of Δθ50 results in better perpendicular crystal orientation. The PMR disk manufactured in Example 1 has a very small value of Δθ50, compared to the PMR disks manufactured in Comparative Examples 2 and 3.

Figure 7:
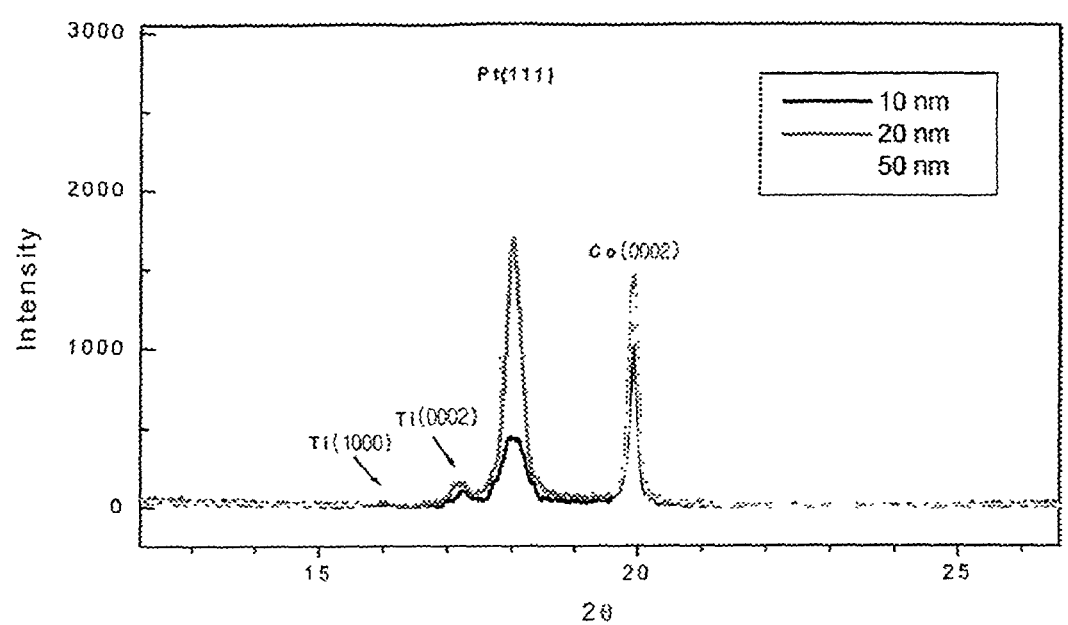
FIG. 7 shows x-ray diffraction spectra for the PMR disks manufactured in Examples 1 and 2 and Comparative Example 4.

The x-ray diffraction spectra for the PMR disks manufactured in Examples 1 and 2 and Comparative Example 4, in which the Pr perpendicular magnetic enhancement layers have different thicknesses, are shown in FIG. 7. A weak Pt(111) diffraction peak is observed for the PMR disk of Comparative Example 4 having a 10-nm-thick Pt perpendicular magnetic enhancement layer. The PMR disk manufactured in Comparative Example 4 also has a relative weak Co(002) diffraction peak, compared to the PMR disks of Examples 1 and 2 having Pt perpendicular magnetic enhancement layers thicker than in Comparative Example 4. This result is considered to be associated with poor deposition of other layers affected by the formation of such a thin Pt perpendicular magnetic enhancement layer.

As described above, a PMR medium according to the present invention includes a Pt, Au, or Pd perpendicular magnetic enhancement layer of an appropriate thickness between a PMR layer and a perpendicular orientation promoting underlayer formed on a substrate. As a result, generation of an intermediate layer caused by a lattice constant mismatch between the PMR layer and the perpendicular orientation promoting underlayer is effectively suppressed with improvement in perpendicular orientation properties due to the inherent crystal growing properties of Pt, Au, and Pd. Also, the Pt, Au, or Pd perpendicular magnetic enhancement layer has a dense structure and thus incorporation of impurities from the substrate is prevented, resulting in a high-purity PMR layer. For the reasons described above, the PMR medium according to the present invention has an improved PMR layer for magnetic properties, SNR, and high-density recording properties.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A perpendicular magnetic recording medium in which a perpendicular magnetic enhancement layer is deposited between a substrate and a perpendicular magnetic recording layer, and a perpendicular orientation promoting underlayer is disposed between the substrate and the perpendicular magnetic enhancement layer that promotes the perpendicular orientation of the perpendicular magnetic recording layer, wherein the perpendicular orientation promoting underlayer is formed of Ti or a Ti alloy, wherein the perpendicular magnetic enhancement layer is formed of Pt and has a thickness no less than 15 nm.

2. A perpendicular magnetic recording medium in which a perpendicular magnetic enhancement layer having a face centered cubic structure and a thickness of 15 nm or greater is deposited between a substrate and a perpendicular magnetic recording layer, and a perpendicular orientation promoting underlayer is disposed between the substrate and the perpendicular magnetic enhancement layer for promoting the perpendicular orientation of the perpendicular magnetic recording layer, wherein the perpendicular orientation promoting underlayer is formed of Ti or a Ti alloy and has a thickness less than 10 nm.

3. The perpendicular magnetic recording medium of claim 1, wherein the perpendicular magnetic recording layer is of a CoCr alloy.

4. The perpendicular magnetic recording medium of claim 3, wherein the perpendicular magnetic recording layer further comprises at least one material selected from the group consisting of B, Pt, Ta, V, Nb, Zr, Y, and Mo.

5. The perpendicular magnetic recording medium of claim 1, further comprising a protective layer and a lubricant layer sequentially on the perpendicular magnetic recording layer.

6. A perpendicular magnetic recording medium in which a perpendicular magnetic enhancement layer having a face centered cubic structure and a thickness of 15 nm or greater is deposited between a substrate and a perpendicular magnetic recording layer, and a perpendicular orientation promoting underlayer is disposed between the substrate and the perpendicular magnetic enhancement layer for promoting the perpendicular orientation of the perpendicular magnetic recording layer, wherein the perpendicular magnetic recording medium has a double-layer structure including a soft magnetic layer between the substrate and the perpendicular orientation promoting underlayer.

7. A perpendicular magnetic recording medium in which a perpendicular magnetic enhancement layer having a face centered cubic structure and a thickness of 15 nm or greater is deposited between a substrate and a perpendicular magnetic recording layer, and a perpendicular orientation promoting underlayer is disposed between the substrate and the perpendicular magnetic enhancement layer for promoting the perpendicular orientation of the perpendicular magnetic recording layer, wherein the perpendicular magnetic recording medium has a pseudo double-layer structure including a soft magnetic layer between the perpendicular orientation promoting underlayer and the perpendicular magnetic recording layer.

8. A perpendicular magnetic recording medium in which a perpendicular magnetic enhancement layer is deposited between a substrate and a perpendicular magnetic recording layer, and a perpendicular orientation promoting underlayer is disposed between the substrate and the perpendicular magnetic enhancement layer that promotes the perpendicular orientation of the perpendicular magnetic recording layer, wherein the perpendicular orientation promoting underlayer is formed of Ti or a Ti alloy, wherein the perpendicular magnetic enhancement layer is formed of Pt, Au, Pd or an alloy of one or more of these materials and has a thickness no less than 15 nm.

9. A perpendicular magnetic recording medium in which a perpendicular magnetic enhancement layer is deposited between a substrate and a perpendicular magnetic recording layer, and a perpendicular orientation promoting underlayer is disposed between the substrate and the perpendicular magnetic enhancement layer that promotes the perpendicular orientation of the perpendicular magnetic recording layer, wherein the perpendicular orientation promoting underlayer is formed of Ti or a Ti alloy, wherein the perpendicular magnetic enhancement layer has a face centered cubic structure and has a thickness no less than 15 nm.

* * * * *